United States Patent [19]

Krapp et al.

[11] Patent Number: 5,484,901
[45] Date of Patent: Jan. 16, 1996

[54] ISOINDOLINEAZO PIGMENTS

[75] Inventors: Michael Krapp, Altrip; Georg Henning, Ludwigshafen, both of Germany

[73] Assignee: BASF Aktiengesellschaft, Ludwigshafen, Germany

[21] Appl. No.: 408,307

[22] Filed: Mar. 22, 1995

[30] Foreign Application Priority Data

Mar. 23, 1994 [DE] Germany .......................... 44 09 902.9

[51] Int. Cl.⁶ .................... C09B 29/036; C09B 29/33; C09B 29/36; D06P 5/00
[52] U.S. Cl. .................. 534/741; 534/742; 534/752; 534/772; 534/776; 534/802; 544/250; 544/300; 544/310; 544/319; 546/272; 548/364.7; 548/471; 106/496; 106/498; 524/89; 524/91; 524/94
[58] Field of Search ..................... 534/752, 776, 534/741, 742, 772, 802; 548/364.7, 471; 106/496; 544/250, 300, 310, 319; 546/272; 524/89, 91, 94

[56] References Cited

U.S. PATENT DOCUMENTS

| | | | |
|---|---|---|---|
| 4,012,370 | 3/1977 | Model | 534/802 |
| 4,221,709 | 9/1980 | Kawamura et al. | 534/741 |
| 4,314,938 | 2/1982 | Model | 534/742 |
| 4,356,123 | 10/1982 | Lotsch | 534/790 X |

FOREIGN PATENT DOCUMENTS

| | | |
|---|---|---|
| 0022076 | 1/1981 | European Pat. Off. . |
| 0190692 | 8/1986 | European Pat. Off. . |
| 209028 | 1/1987 | European Pat. Off. ............... 548/471 |
| 0211272 | 2/1987 | European Pat. Off. . |
| 1537299 | 8/1968 | France . |
| 2424302 | 11/1979 | France . |
| 2901121 | 11/1979 | Germany . |
| 56-55456 | 5/1981 | Japan ..................................... 534/741 |
| 57-123260 | 7/1982 | Japan ..................................... 548/471 |
| 62-174268 | 7/1987 | Japan ..................................... 534/802 |

OTHER PUBLICATIONS

*Chemical Abstracts*, vol. 95, No. 14, p. 80, Oct. 5, 1981.
*Chemical Abstracts*, vol. 98, No. 4, p. 74, Jan. 24, 1983.
*Chemical Abstracts*, vol. 91, No. 8, p. 87, Aug. 20, 1979.

Primary Examiner—Robert W. Ramsuer
Assistant Examiner—Fiona T. Powers
Attorney, Agent, or Firm—Oblon, Spivak, McClelland, Maier & Neustadt

[57] ABSTRACT

Isoindolineazo pigments of the general formula I

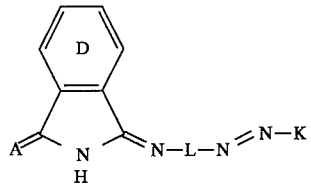

where
  A is the radical of an active-methylene compound or $=S$;
  L is substituted or unsubstituted 1,4-phenylene, 1,3-phenylene or 1,5-naphthylene;
  K is the radical of a coupling component K—H; and the benzene ring D is optionally substituted,
are useful for pigmenting high polymer organic materials.

3 Claims, No Drawings

ISOINDOLINEAZO PIGMENTS

The present invention relates to novel isoindolineazo pigments of the general formula I

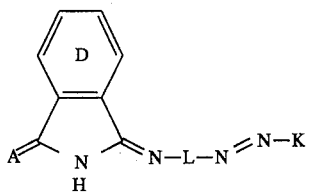

where:

A is a radical of the formula

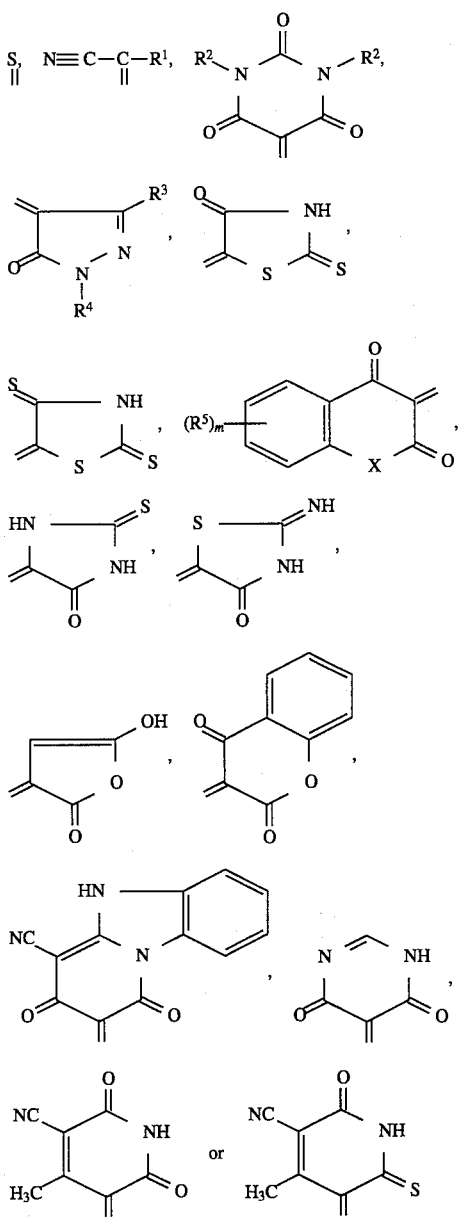

where:
R¹ is
  cyano;
  carbamoyl, with or without substitution by

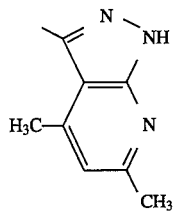

or 3,3,5,5-tetramethyl-4-piperidyl, by $C_1$–$C_{18}$-alkyl, $C_1$–$C_{10}$-alkoxycarbonyl, benzyl, phenyl or naphthyl, which substituents may in turn be substituted by halogen, cyano, nitro, sulfo, $C_1$–$C_{10}$-alkyl, $C_1$–$C_{10}$-alkoxy, $C_1$–$C_{10}$-alkylcarbonyl, $C_1$–$C_{10}$-alkoxycarbonyl, mono ($C_1$–$C_{10}$-alkyl)amino, di($C_1$–$C_{10}$-alkyl) amino, formylamino, $C_2$–$C_{10}$-alkanoylamino, benzoylamino, aminosulfonyl, mono- or di($C_1$–$C_{10}$-alkyl)aminosulfonyl, phenylazo, 3,3,5,5-tetramethyl-4-piperidyl, phthalimidyl, carbamoyl, which can be $C_1$–$C_{10}$-alkyl- monosubstituted or -disubstituted, and/or by trifluoromethyl;

$C_1$–$C_{10}$-alkylcarbonyl, benzoyl, $C_1$–$C_{10}$-alkoxycarbonyl, phenoxycarbonyl or benzyloxycarbonyl, wherein benzoyl, phenoxy and benzyloxy may be substituted by halogen, nitro, sulfo, $C_1$–$C_{10}$-alkyl, formylamino, $C_2$–$C_{10}$-alkanoylamino and/or phthalimidyl;

phenyl, which may be substituted by halogen, cyano, nitro, sulfo and/or trifluoromethyl;

carbazoyl or ureidocarbonyl, whose terminal nitrogen atoms may be substituted once or twice by $C_1$–$C_{10}$-alkyl or benzyl which can carry the abovementioned substituents; a heterocyclic radical of the formula

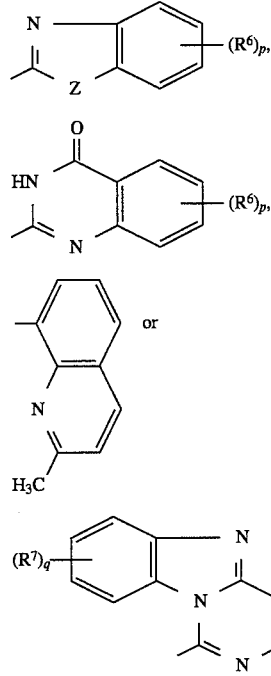

where
Z is —O—, —S— or —NH—,
R⁶ is halogen, nitro, sulfo, $C_1$–$C_6$-alkyl or $C_1$–$C_6$-alkoxy,
R⁷ is halogen, p is from 0 to 2, and q is from 1 to 4;

$R^2$ is independently in each appearance hydrogen, $C_1$–$C_{10}$-alkyl, phenyl or naphthyl, which may each be substituted by halogen, nitro, sulfo, $C_1$–$C_{10}$-alkyl and/or $C_1$–$C_{10}$-alkoxy;

$R^3$ is $C_1$–$C_{10}$-alkyl, amino, benzoylamino, carboxyl, carbamoyl or $C_1$–$C_{10}$-alkoxycarbonyl;

$R^4$ is hydrogen or phenyl which may carry up to two of the following substituents: halogen, nitro, sulfo, carboxyl, carbamoyl, $C_1$–$C_{10}$-alkyl, $C_1$–$C_{10}$-alkoxy or $C_1$–$C_{10}$-alkoxycarbonyl;

$R^5$ is halogen or nitro;

X is —O— or —$NR^8$— where $R^8$ is hydrogen or $C_1$–$C_{10}$-alkyl;

m is from 0 to 4;

L is 1,4-phenylene, 1,3-phenylene or 1,5-naphthylene, which may each carry the following substituents: halogen, nitro, carboxyl, sulfo, sulfonamido, which may be $C_1$–$C_{10}$-alkyl-monosubstituted or -disubstituted, $C_1$–$C_{10}$-alkyl, $C_1$–$C_{10}$-alkoxy, $C_1$–$C_{10}$-alkylcarbonyl, $C_1$–$C_{10}$-alkoxycarbonyl, formylamino, $C_2$–$C_{10}$-alkanoylamino and/or carbamoyl which may be $C_1$–$C_{10}$-alkyl-monosubstituted or disubstituted;

K is the radical of a coupling component of the formula

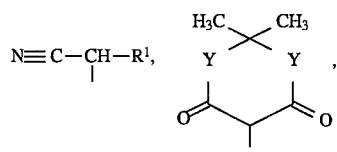

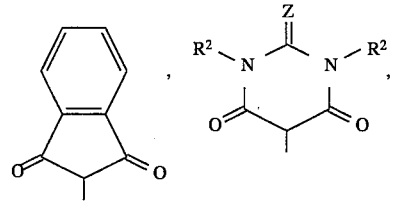

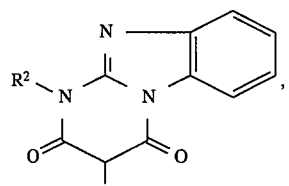

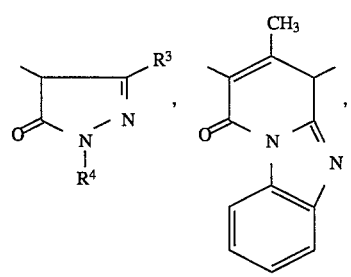

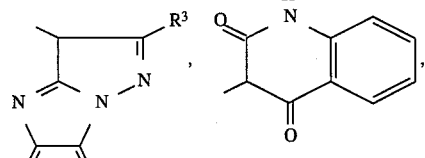

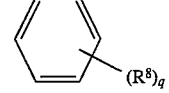

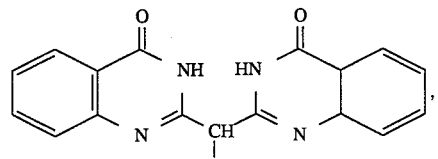

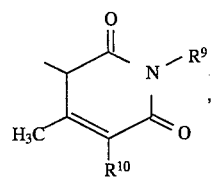

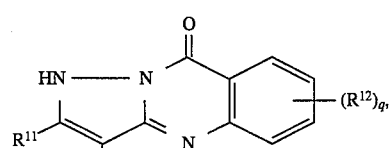

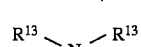

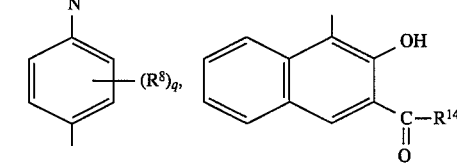

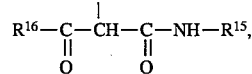

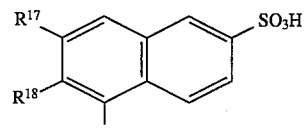

or

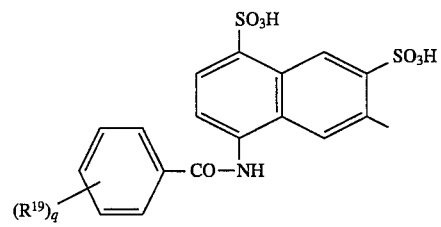

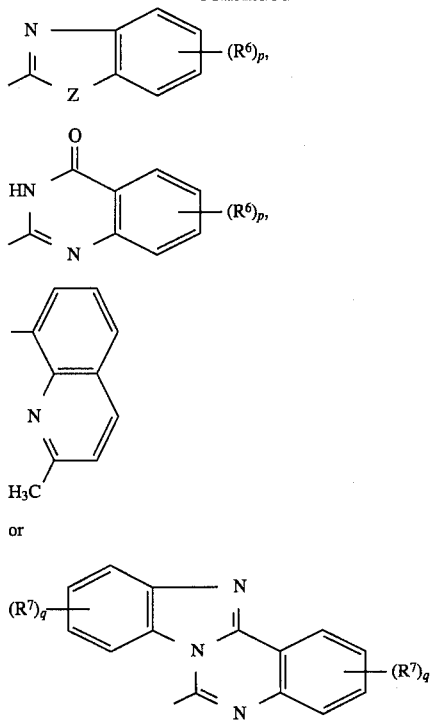

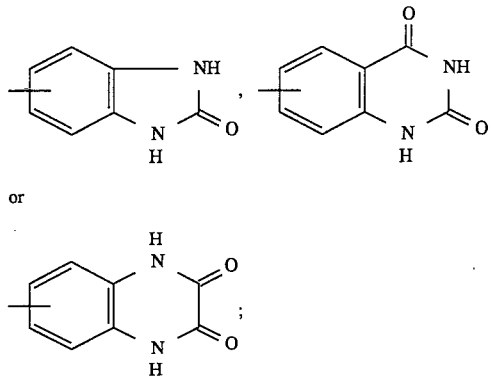

where

- $R^8$ is hydrogen, halogen, nitro, sulfo, $C_1$–$C_{10}$-alkyl, $C_1$–$C_{10}$-alkoxy, $C_1$–$C_{10}$-alkoxycarbonyl and/or carbamoyl which may be $C_1$–$C_{10}$-alkyl-monosubstituted or -disubstituted;
- $R^9$ is $C_1$–$C_{10}$-alkyl, which may be substituted by amino or mono- or di($C_1$–$C_{10}$-alkyl)amino;
- $R^{10}$ is hydrogen, halogen, cyano, sulfo, $C_1$–$C_{10}$-alkylcarbonyl, $C_1$–$C_{10}$-alkoxycarbonyl or carbamoyl which may be $C_1$–$C_{10}$-alkyl-monosubstituted or -disubstituted;
- $R^{11}$ is methyl or phenyl which may carry the following substituents: halogen, hydroxyl, nitro, sulfo, $C_1$–$C_{10}$-alkyl, $C_1$–$C_{10}$-alkoxy, $C_1$–$C_{10}$-alkylcarbonyl, $C_1$–$C_{10}$-alkoxycarbonyl, formylamino, $C_2$–$C_{10}$-alkanoylamino, carboxyl, carbamoyl which may be $C_1$–$C_{10}$-alkyl-monosubstituted or disubstituted, mono- or di($C_1$–$C_{10}$alkyl) or -(phenyl)aminosulfonyl and/or $C_1$–$C_{10}$-alkoxy- or phenoxy-sulfonyl;
- $R^{12}$ is hydrogen, halogen, hydroxyl, sulfo, $C_1$–$C_{10}$-alkyl, $C_1$–$C_{10}$-alkoxyl $C_1$–$C_{10}$-alkylcarbonyl, carbamoyl which may be $C_1$–$C_{10}$-alkyl-monosubstituted or -disubstituted, and/or mono($C_1$–$C_{10}$-alkyl)- or -(phenyl)aminosulfonyl;
- $R^{13}$ is identical or different radicals; hydrogen, $C_1$–$C_{10}$-alkyl or $C_1$–$C_{10}$alkylcarbonyl;
- $R^{14}$ is hydroxyl or a radical of the formula

—NH—$R^{20}$ where $R^{20}$ is hydrogen, phenyl which may carry the substituents mentioned for phenyl under $R^{10}$, or a heterocyclic radical of the formula

- $R^{15}$ is phenyl or naphthyl which may each carry the substituents mentioned for phenyl under $R^{20}$, or one of the heterocyclic radicals $R^{20}$ mentioned under $R^{14}$;
- $R^{16}$ is methyl or a radical of the formula —NH—$R^{15}$;
- $R^{17}$ is hydrogen or sulfo;
- $R^{18}$ is hydrogen or hydroxyl;
- $R^{19}$ is halogen;
- Y is —O— or —$CH_2$—;
- Z is =O or =S;
- the benzene ring D may be substituted by halogen, nitro, carboxyl, carbamoyl, $C_1$–$C_{10}$-alkyl and/or $C_1$–$C_{10}$alkoxy;

and the pigments may be present in the azo or the hydrazo form or in the form of an equilibrium mixture between these two forms and the lakable groups present may be laked.

The novel isoindolineazo pigments, depending on the coupling component, can be present in the azo or in the hydrazo form or in the form of an equilibrium mixture.

The present invention further relates to the preparation of these pigments and to their use for pigmenting macromolecular organic materials.

Isoindolines are an interesting class of pigments for the yellow to red and also brown to black range of hues.

Azo pigments based on isoindolines have so far not been described. Only azo pigments based on isoindolinones (DE-A-29 01 121 and EP-A-22 076) are known.

It is an object of the present invention to provide novel azo pigments which are based on isoindoline and have advantageous application properties and so allow a wider scope for variation as regards the desired hue and the desired application properties.

We have found that this object is achieved by the isoindolineazo pigments of the above-defined formula I.

We have further found a process for preparing isoindolineazo pigments I, which comprises reacting a half-condensate of the formula II

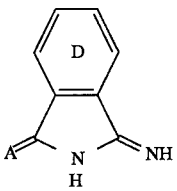

with an aromatic diamine of the formula III

—$H_2N$—L—$NH_2$—    III in an organic solvent which is inert under the reaction conditions and diazotizing the resulting amine of the formula IV

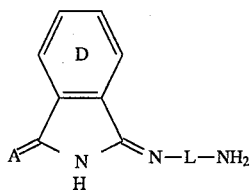 IV and coupling it with a coupling component K—H (V).

Lastly, we have found that the isoindolineazo pigments I are useful for pigmenting high polymer organic materials.

The benzene ring D may carry up to 4 of the following substituents: halogen, nitro, carboxyl, carbamoyl, $C_1$–$C_6$-alkyl and/or $C_1$–$C_6$-alkoxy. Preferably, however, it is unsubstituted.

Suitable radicals A besides sulfur conform in particular to the following radicals of active-methylene compounds with formulae (AI) to (AXI):

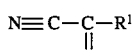 (AI)

where $R^1$ has the following meanings:

cyano;

carbamoyl, with or without substitution by

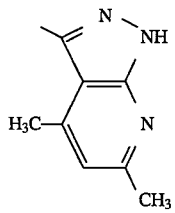

or 3,3,5,5-tetramethyl-4-piperidyl, by $C_1$–$C_{18}$-alkyl, $C_1$–$C_{10}$-alkoxycarbonyl, benzyl, phenyl or naphthyl, which substituents may in 30 turn be substituted by halogen, cyano, nitro, sulfo, $C_1$–$C_{10}$-alkyl, $C_1$–$C_{10}$-alkoxy, $C_1$–$C_{10}$-alkylcarbonyl, formylamino, $C_2$–$C_{10}$-alkanoylamino, $C_1$–$C_{10}$-alkoxycarbonyl, in particular acetyl, mono- or di($C_1$–$C_{10}$-alkylamino), benzoylamino, aminosulfonyl, mono- or di($C_1$–$C_{10}$-alkyl)aminosulfonyl, phenylazo, 3,3,5,5-tetramethyl-4-piperidyl, phthalimidyl, carbamoyl, which can be $C_1$–$C_{10}$-alkyl-monosubstituted or -disubstituted, and/or by trifluoromethyl;

$C_1$–$C_{10}$-alkylcarbonyl, benzoyl, $C_1$–$C_{10}$-alkoxycarbonyl, phenoxycarbonyl or benzyloxycarbonyl, wherein benzoyl, phenoxy and benzyloxy may be substituted by halogen, nitro, sulfo, $C_1$–$C_{10}$-alkyl, formylamino, $C_2$–$C_{10}$-alkanoylamino and/or phthalimidyl; phenyl, which may be substituted by halogen, cyano, nitro, sulfo and/or trifluoromethyl;

carbazoyl or ureidocarbonyl, whose terminal nitrogen atoms may be substituted once or twice by $C_1$–$C_{10}$-alkyl or benzyl which can carry the abovementioned substituents; a heterocyclic radical of the formula

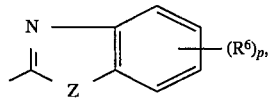

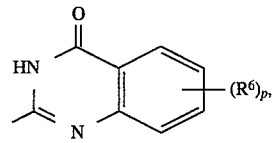

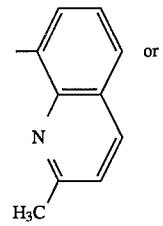 or

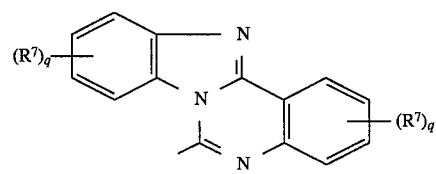

where

Z is —O—, —S— or —NH—, $R^6$ is halogen, nitro, sulfo, $C_1$–$C_6$-alkyl or $C_1$–$C_6$-alkoxy, $R^7$ is halogen, p is from 0 to 2, and q is from 1 to 4;

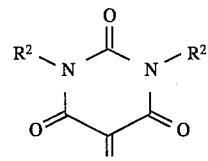 (AII)

where $R^2$ is independently in each appearance hydrogen, $C_1$–$C_{10}$-alkyl, phenyl or naphthyl, which may each be substituted by halogen, nitro, sulfo, $C_1$–$C_{10}$-alkyl and/or $C_1$–$C_{10}$-alkoxy;

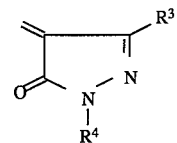 (AIII)

where $R^3$ is $C_1$–$C_{10}$-alkyl, in particular methyl, amino, benzoylamino, carboxyl, carbamoyl or $C_1C_{10}$alkoxycarbonyl;

$R^4$ is hydrogen or phenyl which may carry up to two of the following substituents: halogen, in particular chlorine, nitro, sulfo, carboxyl, carb-amoyl, $C_1$–$C_{10}$-alkyl, $C_1$–$C_{10}$-alkoxy or $C_1$–$C_{10}$-alkoxycarbonyl;

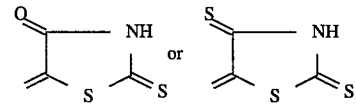 (AIVa,b)

-continued

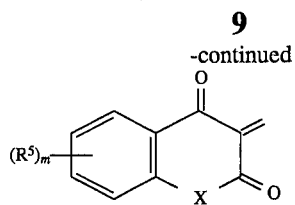 (AV)

where

X is —O— or —NR$^8$—, where R$^8$ is hydrogen or C$_1$–C$_{10}$-alkyl, in particular methyl, R$^5$ is halogen, in particular chlorine or nitro;

m is from 0 to 4;

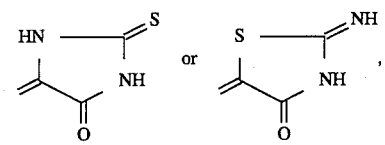 (AVIa,b)

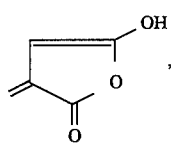 (AVII)

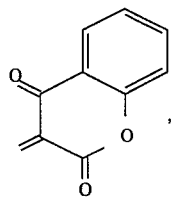 (AVIII)

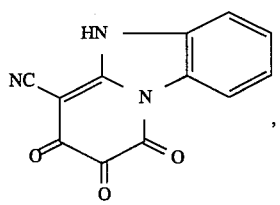 (AIX)

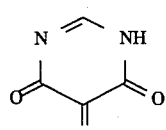 (AX)

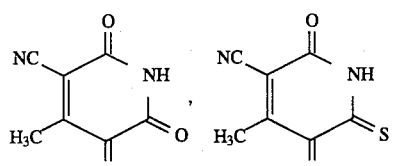 (AXIa,b)

The radicals A of the formula (AI) are mentioned as preferred.

Suitable bridge members L are besides 1,5-naphthylene particularly 1,3-phenylene and very particularly 1,4-phenylene.

The benzene and naphthalene rings may each carry up to two identical or different ones of the following substituents: halogen, nitro, carboxyl, sulfo, sulfonamido, which may be C$_1$–C$_{10}$-alkylcarbonyl-monosubstituted or -disubstituted, C$_1$–C$_{10}$-alkyl, C$_1$–C$_{10}$-alkoxy, C$_1$–C$_{10}$-alkylcarbonyl, C$_1$–C$_{10}$-alkoxycarbonyl, formylamino, C$_2$–C$_{10}$-alkanoylamino and/or carbamoyl which may be C$_1$–C$_{10}$-alkyl- monosubstituted or disubstituted.

Preference here is given to the substituents chlorine, bromine, methyl, methoxy, sulfo, sulfonamido and carbamoyl.

Preferably, however, the aromatic rings are unsubstituted.

Suitable radicals K of the coupling components K—H (V) conform to the formulae (KI) to (KXVIII):

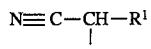 (KI)

where

R$^1$ is as defined above;

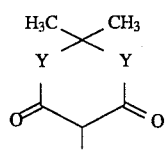 (KII)

where

Y is —O— or —CH$_2$—;

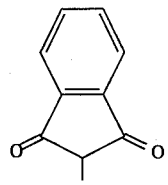 (KIII)

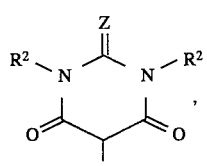 (KIV)

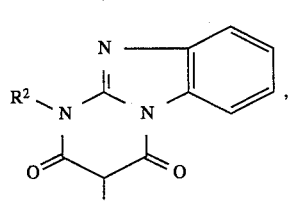 (KV)

where

Z is =O or =S and R$^2$ is as defined above;

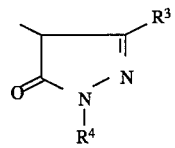 (KVI)

where

R$^3$ and R$^4$ are each as defined above;

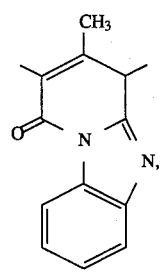 (KVII)

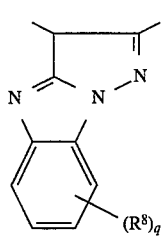
(KVIII)

where
R³ is as defined above, q is from 1 to 4 and
R⁸ is hydrogen, halogen, nitro, sulfo, $C_1$–$C_{10}$-alkyl, $C_1$–$C_{10}$-alkoxy, $C_1$–$C_{10}$-alkoxycarbonyl and/or carbamoyl which may be $C_1$–$C_{10}$-alkyl-monosubstituted or -disubstituted;

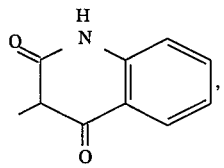
(KIX)

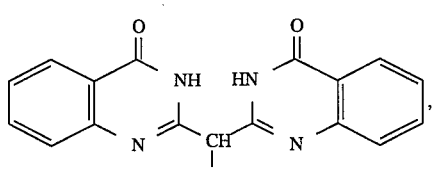
(KX)

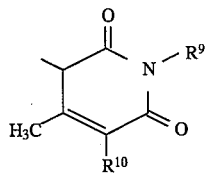
(KXI)

where
R⁹ is $C_1$–$C_{10}$-alkyl, which may be substituted by amino or mono- or di($C_1$–$C_{10}$-alkyl)amino;
R¹⁰ is hydrogen, halogen, cyano, sulfo, $C_1$–$C_{10}$-alkylcarbonyl, $C_1$–$C_{10}$-alkoxycarbonyl or carbamoyl which may be $C_1$–$C_{10}$-alkyl-monosubstituted or -disubstituted;

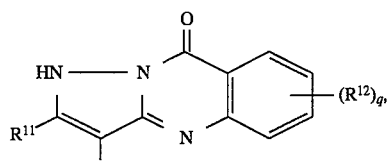
(KXII)

where
R¹¹ is methyl or phenyl which may carry the following substituents: halogen, hydroxyl, nitro, sulfo, $C_1$–$C_{10}$-alkyl, $C_1$–$C_{10}$-alkoxy, $C_1$–$C_{10}$-alkylcarbonyl, formylamino, $C_2$–$C_{10}$-alkanoylamino, carbamoyl which may be ($C_1$–$C_{10}$-alkyl)-monosubstituted or disubstituted, mono- or di($C_1$–$C_{10}$alkyl) or -(phenyl)aminosulfonyl and/or $C_1$–$C_{10}$-alkoxy- or phenoxy-sulfonyl;
R¹² is hydrogen, halogen, hydroxyl, sulfo, $C_1$–$C_{10}$-alkyl, $C_1$–$C_{10}$-alkoxy, $C_1$–$C_{10}$-alkylcarbonyl, carbamoyl which may be $C_1$–$C_{10}$-alkyl-monosubstituted or -disubstituted, and/or mono($C_1$–$C_{10}$-alkyl)- or -(phenyl)aminosulfonyl;

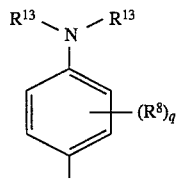
(KXIII)

where
R⁸ is as defined above and
R¹³ is identical or different radicals, hydrogen, $C_1$–$C_{10}$-alkyl or $C_1$–$C_{10}$-alkylcarbonyl;

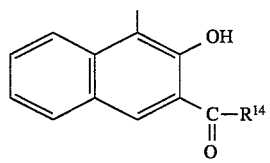
(KXIV)

where
R¹⁴ is hydroxyl or a radical of the formula

—NH—R²⁰ where R²⁰ is hydrogen, phenyl which may carry the substituents mentioned for phenyl under R¹⁰, or a heterocyclic radical of the formula

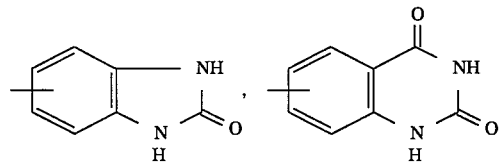

or

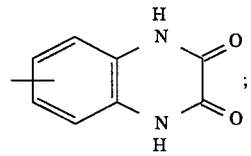

;

$R^{16}$—C—CH—C—NH—$R^{15}$ (KXV)
       ‖      ‖
       O      O where
R¹⁵ is phenyl or naphthyl which may each carry the substituents mentioned for phenyl under R¹⁰, or one of the heterocyclic radicals R²⁰ mentioned under R¹⁴;
R¹⁶ is methyl or a radical of the formula —NH—R¹⁵;

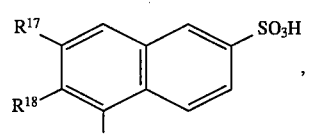
(KXVI)

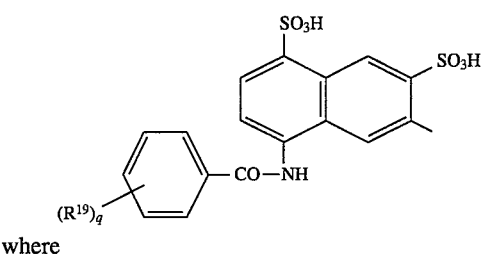
(KXVII)

where $R^{17}$ is hydrogen or sulfo;

$R^{18}$ is hydrogen or hydroxyl;

$R^{19}$ is halogen.

The radicals of preferred coupling components are the radicals of the formulae (KIV) and (KVI).

Examples of the aforementioned radicals are:

$C_1$–$C_{18}$-alkyl, preferably $C_1$–$C_{10}$-alkyl, particularly preferably $C_1$–$C_6$-alkyl, such as methyl, ethyl, propyl, isopropyl, butyl, isobutyl, sec-butyl, tert-butyl, pentyl, isopentyl, neopentyl, tert-pentyl, hexyl and 2-methylpentyl, in particular methyl and ethyl;

$C_1$–$C_{10}$-alkoxy, preferably $C_1$–$C_6$-alkoxy, such as methoxy, ethoxy, propoxy, isopropoxy, butoxy, isobutoxy, sec-butoxy, tert-butoxy, pentyloxy and hexyloxy, in particular methoxy and ethoxy;

$C_1$–$C_{10}$-alkylcarbonyl, preferably $C_1$–$C_6$-alkylcarbonyl, such as acetyl, propionyl, in particular acetyl;

$C_1$–$C_{10}$-alkoxycarbonyl, preferably $C_1$–$C_6$-alkoxycarbonyl, such as in particular methoxycarbonyl and ethoxycarbonyl;

mono- and di($C_1$–$C_{10}$-alkyl)amino, preferably mono- and di($C_1$–$C_6$-alkyl)amino, such as methylamino, ethylamino, propylamino, isopropylamino, butylamino, pentylamino and hexylamino, in particular methylamino and ethylamino; cycloalkylamino such as cyclopropyl-, cyclobutyl-, cyclopentyl- and cyclohexyl-amino; dimethylamino, diethylamino, dipropylamino, diisopropylamino and methylethylamino;

$C_2$–$C_{10}$-alkanoylamino, preferably $C_2$–$C_7$-alkanoylamino: in particular acetylamino;

mono- and di($C_1$–$C_{10}$-alkyl)aminosulfonyl, preferably mono- and di($C_1$–$C_6$-alkyl)aminosulfonyl: methyl- and ethyl-aminosulfonyl;

$C_1$–$C_{10}$-alkoxysulfonyl, preferably $C_1$–$C_6$-alkoxysulfonyl: methoxy- and ethoxy-sulfonyl;

halogen: in particular chlorine and bromine.

If the isoindolineazo pigments I contain lakable groups such as carboxyl or sulfo, these can also be present in laked form, ie. as metal salts.

Suitable metals here include for example lithium, sodium, potassium, strontium, barium, aluminum, copper, iron, cobalt, nickel and in particular magnesium, calcium, zinc and manganese.

In the novel process for preparing the isoindolineazo pigments I, first a half-condensate II is reacted with an aromatic diamine III in an organic solvent which is inert under the reaction conditions to give an amine of the formula IV

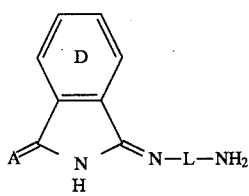

which is then diazotized in a conventional manner and coupled with a coupling component K—H (V), it being surprising that the amine IV is so stable in the acid medium that it can be diazotized.

Suitable inert organic solvents for preparing the amine IV are, as described in German Patent Application P 43 41 769.8, polar protic solvents such as mono- or polyhydric aromatic alcohols and aliphatic alcohols, ether-alcohols, open-chain and cyclic ethers, dipolar aprotic solvents and aromatic solvents such as nitrobenzene, toluene and chlorobenzene.

Specific examples are phenol, $C_1$–$C_6$-alcohols, preferably $C_1$–$C_4$-alkanols such as ethanol, propanol, isopropanol, butanol and in particular methanol; ethylene glycol mono- and di($C_1$–$C_6$-alkyl) ethers such as ethylene glycol monomethyl and dimethyl ether, oligo- and polyglycols and glycol ethers such as diethylene glycol monomethyl ether, dioxane and tetrahydrofuran; dimethyl sulfoxide and amidic solvents such as dimethylformamide, dimethylacetamide, N-methylpyrrolidone. Also suitable are mixtures of these solvents, for example dimethylacetamide/alkanol, phenol/alkanol.

The amount of solvent is not critical per se and generally ranges from 5 to 100 g, preferably from 10 to 50 g, per g of II.

Half-condensate II and diamine III are advantageously used in substantially equimolar ratio.

The half-condensates II are known per se or are preparable in a known manner by reacting the corresponding iminoaminoisoindolenines, trichloroisoindolenines and appropriately activated derivatives or directly from the corresponding o-phthalodinitriles with active-methylene (acidic C—H) compounds.

Generally, the reaction of II with III is carried out at from 0° to 100° C., in particular at from 30° to 80° C. The temperature to be used also depends on the refluxing temperature of the solvent used.

Typically the reaction is carried out at atmospheric pressure. However, the reaction can also be carried out under superatmospheric pressure.

Typical reaction times range from about 10 min to 5 h, and the reaction will usually have ended after the heating-up phase.

The process is generally carried out by initially charging a heated or unheated mixture of solvent and half-condensate II and adding the aromatic diamine III. This addition may be continuous.

The amine IV is then advantageously isolated and as is generally customary, diazotized and coupled with the coupling component V.

Suitable solvents for the diazotization include in particular dipolar aprotic solvents such as N-methylpyrrolidone, dimethylformamide and dimethylacetamide and water and also mixtures thereof.

The diazotization is carried out in the presence of an organic acid such as acetic acid (glacial acetic acid) and propionic acid or an inorganic acid such as hydrochloric acid, sulfuric acid, nitric acid and phosphoric acid.

Suitable diazotizing agents are the compounds customarily used for this purpose such as alkali metal nitrites, in particular sodium nitrite, organic nitrites, in particular glycol nitrite and isoamyl nitrite, and nitrosylsulfuric acid.

The concentration of the reaction mixture is determined by its stirrability.

The reaction temperature depends on the reactivity and stability of the reactants and their solubility and generally ranges from –20° to 50° C., preferably from 0° to 5° C.

After the diazotization has ended, which can take from a few minutes to some hours, the pH required for the coupling (generally a pH from 4 to 6) is set by adding a base such as sodium hydroxide solution and the coupling component, advantageously dissolved in one of the abovementioned solvents, an alcohol or a mixture thereof, if necessary with a base (for example sodium hydroxide solution), is added.

The reaction mixture can be worked up for the isoindolineazo pigments I in a conventional manner by, after the mixture has cooled down, filtering off the pigments, washing them if necessary with an inert solvent such as dimethylformamide, dimethylacetamide or N-methylpyrrolidone or glacial acetic acid, alcohols and/or water, and drying.

Depending on the use requirements, the pigments can be used directly in the form in which they were obtained, or first a customary grinding and/or customary solvent treatment is carried out in the presence or absence of crystallization control additives. Of course, the crystallization can also be controlled even in the course of the synthesis by means of conventional measures such as the addition of crystallization-inhibiting additives, the action of shearing forces during the reaction and the addition of grinding media and/or specific temperature control.

The process of the present invention makes it possible to prepare the isoindolineazo pigments in a specific manner in good yield and purity.

The isoindolineazo pigments I thus obtainable can be used with advantage for coloring macromolecular organic materials. More particular uses are the preparation of printing inks and coatings and the pigmenting of plastics.

Examples of materials to be colored are natural resins; synthetic resins (addition polymerization and condensation resins) such as alkyd resins, acrylic resins, epoxy resins, amino-formaldehyde resins such as melamine and urea resins; cellulose ethers and esters such as ethylcellulose, nitrocellulose, cellulose acetate and butyrate; polyurethanes; polyvinyl chlorides; rubber, chlororubber; polyolefins; polyamides; polyesters; epoxy esters; polycarbonates; phenolic resins; natural rubber; casein; silicone and silicone resins; and also mixtures thereof.

The macromolecular organic materials can be colored as plastic materials, melts, solutions, emulsions or dispersions. Coatings and printing inks are preferably prepared using solutions or dispersions. Examples of preferred coating systems are alkyd/melamine resin coatings, acrylic/melamine resin coatings, cellulose acetate/cellulose butyrate coatings and two-pack coatings based on acrylic resins crosslinkable with polyisocyanate.

EXAMPLES

Preparation of isoindolineazo pigments of the formula

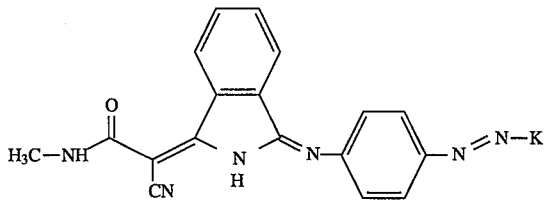

Examples 1

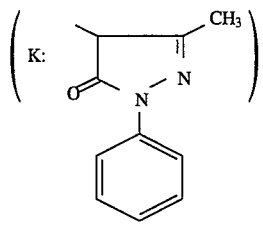

a) Preparation of diazo component IV

To a suspension of 22.6 g of the half-condensate

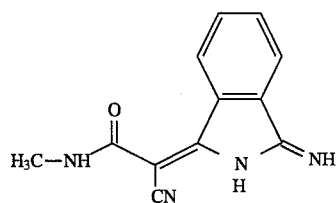

in 300 ml of methanol were added dropwise at room temperature 10.8 g of p-phenylenediamine, dissolved in 100 ml of methanol. The reaction mixture was then stirred for 1 h under reflux.

The solvent was then half distilled off and the precipitate was isolated by filtration, washed with methanol and water and dried.

28.7 g were obtained of the compound

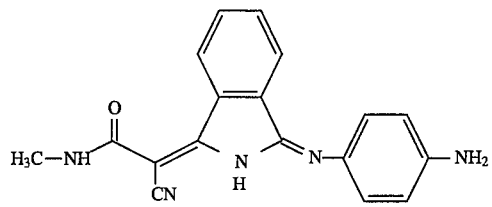

as a red powder having a melting point of 285° C., which corresponds to a yield of 90.5%.

Physical data:

Elemental analysis: C: obs. 68.0 (calc. 68.1); H: obs. 4.9 (calc. 4.8); O: obs. 5.5 (calc. 5.0); N: obs. 21.9 (calc. 22.1); MS: m/e=317.0 ($C_{18}H_{15}ON_5^+$);

$^1$H-NMR(DMSO-$d_6$; TMS): 2.72–2.73 (d, 1H, NH—C$\underline{H}_3$); 2.80–2.82 (d, 2H, NH—C$\underline{H}_3$); 3.73 (s, water); 5.29 (s; broad); 5.41 (s; broad); 6.67–6.72 (m, 2H, arom.); 6.94–6.97 (d, 0.6H, arom.); 7.49–7.52 (d, 1.4H, arom.); 7.68–7.71 (m, 2H, arom.); 8.0–8.1 (m, 0.6H, arom.), 8.25–8.37 (m, 1.4H, arom.); 9.91–9.94 (q, 1H, N$\underline{H}$—CH$_3$); 11.27 (broad); 12.01 (mobile protons) ppm;

TLC (Merck silica gel 60 $F_{254}$, ready-made aluminum foil sheets): $R_f$ (acetone): 0.8; $R_f$ (3:1:1 v/v/v n-butanol/glacial acetic acid/water): 0.82; $R_f$ (7:1:1 v/v/v toluene/glacial acetic acid/ethyl acetate): 0.45.

b) Diazotization and coupling

A solution of 15.9 g (0.05 mol) of the diazo component obtained in a), in 100 ml of N-methylpyrrolidone, was admixed at room temperature with 15 ml of concentrated hydrochloric acid. After cooling down to 0° C. 15 ml of 23% strength by weight sodium nitrite solution were added dropwise.

After stirring for one hour at 0°–5° C., first 0.5 g of amidosulfuric acid was added, followed by 9.5 g (0.055 mol) of N-phenylmethylpyrazolone, dissolved in 100 ml of methanol and 3 ml of 30% strength by weight sodium hydroxide solution. The pH was maintained at from 4 to 5.

As soon as the diazo component was no longer detectable (after 2 h) the reaction mixture was warmed to room temperature and filtered.

The isolated precipitate was washed with N-methylpyrrolidone and water and dried at 80° C.

24.1 g were obtained of the target product as a red powder, which corresponds to a yield of 96%.

Elemental analysis: C: obs. 66.5 (calc. 66.92); H: obs. 4.5 (calc. 4.41); O: obs. 6.3 (calc. 6.37); N: obs. 22.1 (calc. 22.3).

To assess the colorimetric properties, 1 g of pigment and 9.5 g of a baking finish mixture of 70% by weight of coco-alkyd resin (60% strength by weight in xylene) and 30% by weight of melamine resin (55% strength by weight in butanol/xylene) were ground in an attritor, applied to a metal sheet, flashed off and baked at 120° C. for 30 min.

A red coating was obtained.

Examples 2 to 52

The method of Example 1 was utilized to prepare the isoindolineazo pigments listed below in the table (coupling pH from 3 to 5) and incorporate them into the abovementioned coating system.

TABLE

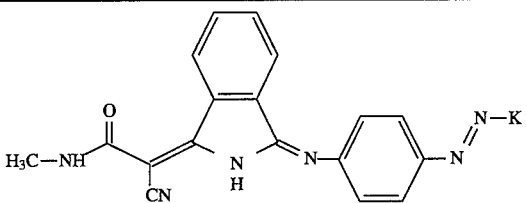

| Ex. | K | Coating color |
|---|---|---|
| 2 | pyrazolone with 2-chlorophenyl | reddish orange |
| 3 | pyrazolone with 4-methylphenyl | reddish orange |
| 4 | pyrazolone with 3-chlorophenyl | red |
| 5 | pyrazolone with 4-chlorophenyl | reddish orange |
| 6 | pyrazolone with 2,5-dichlorophenyl | orange |

TABLE-continued

Structure: H₃C—NH—C(=O)—C(CN)=C(—Ar—)—NH—... where Ar is ortho-disubstituted benzene, with —C(=N—C₆H₄—N=N—K)— substituent

| Ex. | K | Coating color |
|---|---|---|
| 7 | 3-methyl-5-oxo-4H-pyrazol-4-yl (with CH₃ at 4-position, NH) | reddish brown |
| 8 | 1-(4-carboxyphenyl)-3-methyl-5-oxo-4H-pyrazol-4-yl (with CH₃ at 4-position) | reddish brown |
| 9 | CH(COCH₃)(...)—malonamide derivative: HN—C(=O)—CH(CH₃)—C(=O)—NH with acetyl bridge | reddish brown |
| 10 | enol form: O=C(NH—)—C(CH₃)=C(ONa)—N(CH₃)— with acetyl bridge | dark red |
| 11 | enol form: O=C(NH—)—C(CH₃)=C(ONa)—N(C₂H₅)— with acetyl bridge | dark red |
| 12 | enol form: O=C(NH—)—CH(CH₃)—CH(ONa)—NH— with acetyl bridge | red |
| 13 | O=C(NH—)—CH(CH₃)—C(=O)—N(C₄H₉)— with acetyl bridge | red |
| 14 | O=C(NH—)—CH(CH₃)—C(=O)—N(C₆H₅)— with acetyl bridge | red |

TABLE-continued

[Structure: 2-[3-(methylamino)-3-oxo-1-[2-[[[4-(K-azo)phenyl]imino]methyl]phenyl]prop-1-en-2-yl]... with H₃C—NH—C(=O)—C(CN)=C(CH₃)—[isoindole NH]—C(=N-)—[phenyl]—N=N—K]

| Ex. | K | Coating color |
|---|---|---|
| 15 | [CH₃-C(=O)-CH(CH₃)-CH(ONa)-N(Ph)-; HN-C(=O)- acetamido] | red |
| 16 | [CH₃-C(=O)-CH(CH₃)-C(=O)-N(4-tolyl)-; HN-acetyl] | dark red |
| 17 | [CH₃-C(=O)-CH(CH₃)-CH(ONa)-N(4-tolyl)-; HN-acetyl] | red |
| 18 | [CH₃-C(=O)-CH(CH₃)-C(=O)-N(4-methoxyphenyl)-; HN-acetyl] | dark red |
| 19 | [CH₃-C(=O)-CH(CH₃)-C(=O)-; N,N'-dimethyl urea bridge] | red |
| 20 | [CH₃-C(=O)-CH(CH₃)-C(=NH)-; HN-C(=O)-NH cyclic (with acetyl)] | brown |
| 21 | [CH₃-C(=O)-CH(CH₃)-C(=O)-; HN-C(=S)-NH cyclic] | brown |

TABLE-continued

[Structure: H3C-NH-C(=O)-C(CN)=C(-C6H4-)-C(=N-C6H4-N=N-K)-NH]

| Ex. | K | Coating color |
|---|---|---|
| 22 | [structure with HN, NH, C=S, ONa] | brown |
| 23 | [malonate structure with O-C(CH3)2-O, H3C, CH3] | yellow |
| 24 | [dimedone structure, H3C, CH3] | orange |
| 25 | [pyridine with HO, CH3, N, CN, OH] | dark green |
| 26 | [pyrazoloquinazolinone structure, HN-N, H3C, N] | reddish dark brown |
| 27 | [dichloro pyrazoloquinazolinone structure, HN-N, H3C, N, Cl, Cl] | violetish black |
| 28 | H3C—CO—CH—CO—NH—C6H5 | brown |
| 29 | H3C—CO—CH—CO—NH—C6H4—Cl | brown |

TABLE-continued

[Structure: H3C—NH—C(O)—C(CN)=C(phenyl)—C(=N—C6H4—N=N—K)—NH, with phenyl ortho-disubstituted]

| Ex. | K | Coating color |
|---|---|---|
| 30 | H3C—CO—CH(—)—CO—NH—(2,5-dichlorophenyl) | brown |
| 31 | H3C—CO—CH(—)—CO—NH—(2-methoxyphenyl) | blackish red |
| 32 | H3C—CO—CH(—)—CO—NH—(2,4-dimethoxyphenyl) | brown |
| 33 | H3C—CO—CH(—)—CO—NH—(2-chloro-4,5-dimethoxyphenyl) | brown |
| 34 | H3C—CO—CH(—)—CO—NH—(2,5-dimethylphenyl) | blackish red |
| 35 | H3C—CO—CH(—)—CO—NH—(4-hydroxyphenyl) | blackish red |
| 36 | H3C—CO—CH(—)—CO—NH—(3-hydroxyphenyl) | blackish red |
| 37 | H3C—CO—CH(—)—CO—NH—CH3 | brown |
| 38 | H3C—CO—CH(—)—CO—NH—(1-naphthyl) | blackish brown |

TABLE-continued

[Structure: H₃C—NH—C(=O)—C(CN)=C(—[benzene ring]—C(=N—[phenyl]—N=N—K)—NH—)]

| Ex. | K | Coating color |
|-----|---|---------------|
| 39 | 1-methyl-2-hydroxy-naphthalene | brown |
| 40 | 4-methyl-3-hydroxy-2-COOH-naphthalene | dark brown |
| 41 | 4-methyl-3-hydroxy-naphthalene-2-CO—NH—(2,5-dimethoxyphenyl) | dark brown |
| 42 | 4-methyl-3-hydroxy-naphthalene-2-CO—NH—(4-chlorophenyl) | dark brown |
| 43 | 4-methyl-3-hydroxy-naphthalene-2-CO—NH—(4-methylphenyl) | dark brown |
| 44 | 4-methyl-3-hydroxy-naphthalene-2-CO—NH—(2,4-dimethoxy-5-chlorophenyl) | dark brown |
| 45 | 4-methyl-3-hydroxy-naphthalene-2-CO—NH—(2-methoxyphenyl) | dark brown |
| 46 | 4-methyl-3-hydroxy-naphthalene-2-CO—NH—(2-ethoxyphenyl) | dark brown |

TABLE-continued

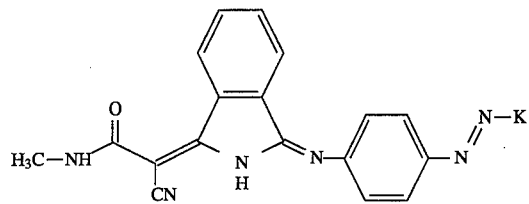

| Ex. | K | Coating color |
|---|---|---|
| 47 | [4-methyl-3-hydroxy-naphthyl-2-carboxamido-(3-nitrophenyl)] | dark brown |
| 48 | [4-methyl-3-hydroxy-naphthyl-2-carboxamido-(4-methoxyphenyl)] | dark brown |
| 49 | [4-methyl-3-hydroxy-naphthyl-2-carboxamido-(2-methyl-4-chlorophenyl)] | dark brown |
| 50 | [8-methyl-3-hydroxy-naphthyl-2-carboxanilide] | dark brown |
| 51 | [4-methyl-3-hydroxy-naphthyl-2-carboxamido-(1-naphthyl)] | dark brown |
| 52 | [4-methyl-3-hydroxy-naphthyl-2-carboxamido-(2-naphthyl)] | dark brown |

We claim:

1. Isoindolineazo pigment of the general formula I

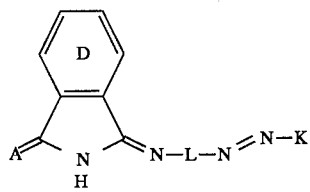

where:

A is a radical of the formula

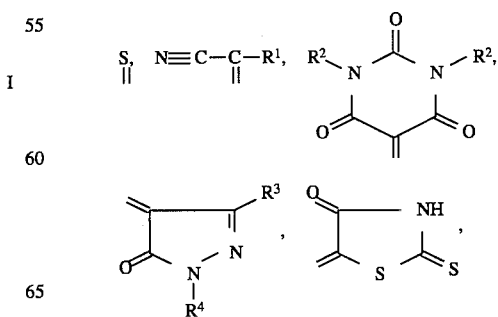

-continued

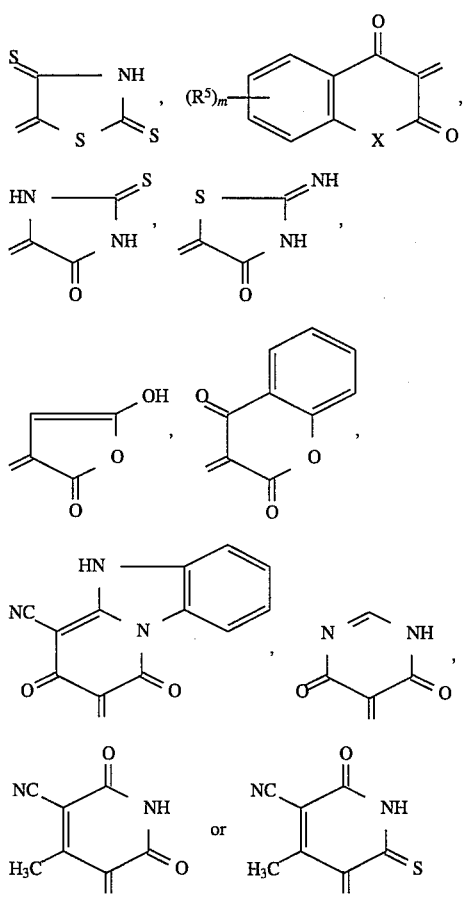

where
R¹ is
cyano;
carbamoyl with or without substitution by

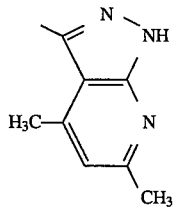

or 3,3,5,5-tetramethyl-4-piperidyl, by $C_1$–$C_{18}$-alkyl $C_1$–$C_{10}$-alkoxycarbonyl, benzyl, phenyl or naphthyl, which substituents may in turn be substituted by halogen, cyano, nitro, sulfo, $C_1$–$C_{10}$-alkyl, $C_1$–$C_{10}$-alkoxy, $C_1$–$C_{10}$-alkylcarbonyl, $C_1$–$C_{10}$-alkoxycarbonyl, mono($C_1$–$C_{10}$-alkyl)amino, di($C_1$–$C_{10}$-alkyl)amino, formylamino, $C_2$–$C_{10}$-alkanoylamino, benzoylamino, aminosulfonyl, mono- or di($C_1$–$C_{10}$-alkyl)aminosulfonyl, phenylazo, 3,3,5,5-tetramethyl-4-piperidyl, phthalimidyl, carbamoyl, which can be $C_1$–$C_{10}$-alkyl-monosubstituted or -disubstituted, and/or by trifluoromethyl;
$C_1$–$C_{10}$-alkylcarbonyl, benzoyl, $C_1$–$C_{10}$-alkoxycarbonyl, phenoxycarbonyl or benzyloxycarbonyl, wherein benzoyl, phenoxy and benzyloxy may be substituted by halogen, nitro, sulfo, $C_1$–$C_{10}$-alkyl, formylamino, $C_2$–$C_{10}$-alkanoylamino and/or phthalimidyl; phenyl, which may be substituted by halogen, cyano, nitro, sulfo and/or trifluoromethyl;
carbazoyl or ureidocarbonyl, whose terminal nitrogen atoms may be substituted once or twice by $C_1$–$C_{10}$-alkyl or benzyl which can carry the abovementioned substituents;
a heterocyclic radical of the formula

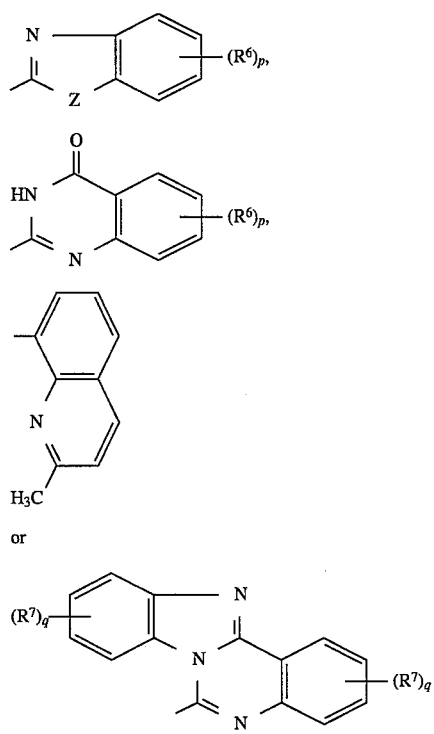

where
Z is —O—, —S— or —NH—,
R⁶ is halogen, nitro, sulfo, $C_1$–$C_6$-alkyl or $C_1$–$C_6$-alkoxy,
R⁷ is halogen,
p is from 0 to 2, and
q is from 1 to 4;
R² is independently in each appearance hydrogen, $C_1$–$C_{10}$-alkyl, phenyl or naphthyl, which may each be substituted by halogen, nitro, sulfo, $C_1$–$C_{10}$-alkyl and/or $C_1$–$C_{10}$-alkoxy;
R³ is $C_1$–$C_{10}$-alkyl, amino, benzoylamino, carboxyl, carbamoyl or $C_1$–$C_{10}$-alkoxycarbonyl;
R⁴ is hydrogen or phenyl which may carry up to two of the following substituents: halogen, nitro, sulfo, carboxyl, carbamoyl, $C_1$–$C_{10}$-alkyl, $C_1$–$C_{10}$alkoxy or $C_1$–$C_{10}$-alkoxycarbonyl;
R⁵ is halogen or nitro;
X is —O— or —NR⁸—
where R⁸ is hydrogen or $C_1$–$C_{10}$-alkyl;
m is from 0 to 4;
L is 1,4-phenylene, 1,3-phenylene or 1,5-naphthylene, which may each carry the following substituents: halogen, nitro, carboxyl, sulfo, sulfonamido, which may be $C_1$–$C_{10}$-alkyl-monosubstituted or -disubstituted, $C_1$–$C_{10}$-alkyl, $C_1$–$C_{10}$-alkoxy, $C_1$–$C_{10}$-alkylcarbonyl, $C_1$–$C_{10}$-alkoxycarbonyl, formylamino, $C_2$–$C_{10}$-alkanoylamino and/or carbamoyl which may be $C_1$–$C_{10}$-alkyl-monosubstituted or disubstituted;

K is the radical of a coupling component of the formula

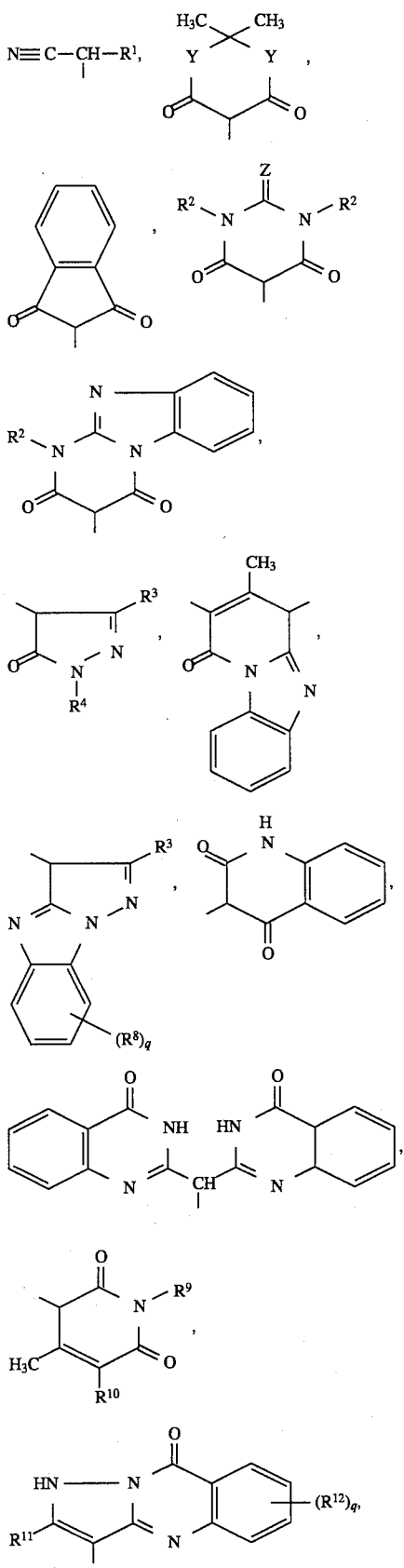

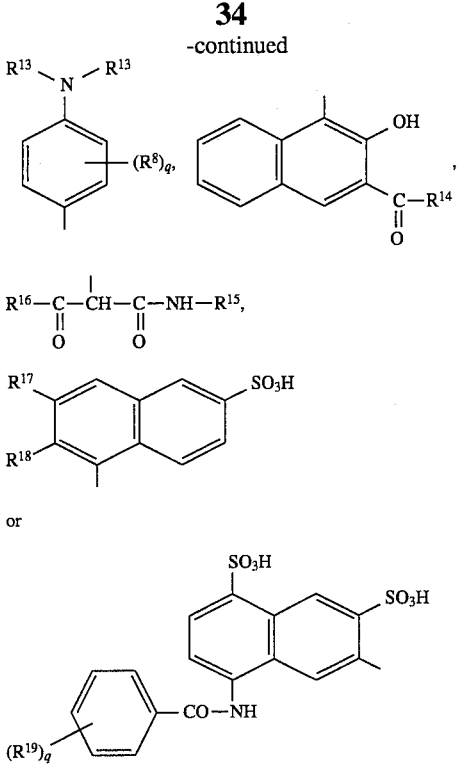

where
- $R^8$ is hydrogen, halogen, nitro, sulfo, $C_1$–$C_{10}$-alkyl, $C_1$–$C_{10}$-alkoxy, $C_1$–$C_{10}$-alkoxycarbonyl and/or carbamoyl which may be $C_1$–$C_{10}$-alkyl-monosubstituted or -disubstituted;
- $R^9$ is $C_1$–$C_{10}$-alkyl, which may be substituted by amino or mono- or di($C_1$–$C_{10}$-alkyl)amino;
- $R^{10}$ is hydrogen, halogen, cyano, sulfo, $C_1$–$C_{10}$-alkylcarbonyl, $C_1$–$C_{10}$-alkoxycarbonyl or carbamoyl which may be $C_1$–$C_{10}$-alkyl-monosubstituted or -disubstituted;
- $R^{11}$ is methyl or phenyl which may carry the following substituents: halogen, hydroxyl, nitro, sulfo, $C_1$–$C_{10}$-alkyl, $C_1$–$C_{10}$-alkoxy, $C_1$–$C_{10}$-alkylcarbonyl, $C_1$–$C_{10}$-alkoxycarbonyl, formylamino, $C_2$–$C_{10}$-alkyanoyamino, carboxyl, carbamoyl which may be $C_1$–$C_{10}$-alkyl-monosubstituted or disubstituted, mono- or di($C_1$–$C_{10}$alkyl) or -(phenyl)aminosulfonyl and/or $C_1$–$C_{10}$-alkoxy- or phenoxy-sulfonyl;
- $R^{12}$ is hydrogen, halogen, hydroxyl, sulfo, $C_1$–$C_{10}$-alkyl, $C_1$–$C_{10}$-alkoxy, $C_1$–$C_{10}$-alkylcarbonyl, carbamoyl which may be $C_1$–$C_{10}$-alkyl-monosubstituted or -disubstituted, and/or mono($C_1$–$C_{10}$-alkyl)- or -(phenyl)aminosulfonyl;
- $R^{13}$ is identical or different radicals: hydrogen, $C_1$–$C_{10}$-alkyl or $C_1$–$C_{10}$-alkylcarbonyl;
- $R^{14}$ is hydroxyl or a radical of the formula

—NH—$R^{20}$ where $R^{20}$ is hydrogen, phenyl which may carry the substituents mentioned for phenyl under $R^{10}$, or a heterocyclic radical of the formula

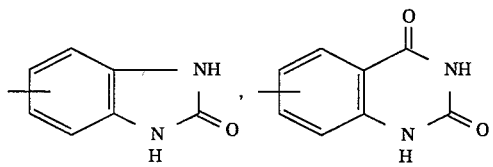

or

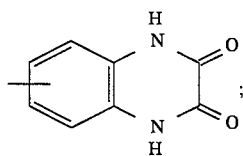

$R^{15}$ is phenyl or naphthyl which may each carry the substituents mentioned for phenyl under $R^{10}$, or one of the heterocyclic radicals $R^{20}$ mentioned under $R^{14}$;
$R^{16}$ is methyl or a radical of the formula —NH—$R^{15}$;
$R^{17}$ is hydrogen or sulfo;
$R^{18}$ is hydrogen or hydroxyl;
$R^{19}$ is halogen;
Y is —O— or —CH$_2$—;
Z is =O or =S;
the benzene ring D may be substituted by halogen, nitro, carboxyl, carbamoyl, $C_1$–$C_{10}$-alkyl and/or $C_1$–$C_{10}$-alkoxy;
and the pigments may be present in the azo or the hydrazo form or in the form of an equilibrium mixture between these two forms and the lakable groups present may be laked.

2. Isoindolineazo pigment of the formula I as claimed in claim 1 wherein

A is a radical of the formula

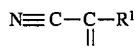

L is 1,4-phenylene and
K is a radical of the formula

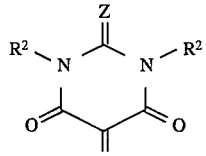

or

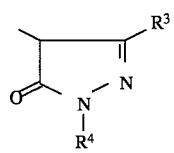

3. A process for pigmenting high polymer organic materials, which comprises incorporating into said material an isoindolineazo pigment of the formula I as set forth in claim 1.

* * * * *